(12) United States Patent
Bryan et al.

(10) Patent No.: US 8,203,810 B2
(45) Date of Patent: Jun. 19, 2012

(54) SOLID STATE PRE-CHARGE MODULE

(75) Inventors: Lyle Stanley Bryan, Advance, NC (US); John Steven Cowan, Winston-Salem, NC (US)

(73) Assignee: Tyco Electronics Corporation, Middletown, PA (US)

( * ) Notice: Subject to any disclaimer, the term of this patent is extended or adjusted under 35 U.S.C. 154(b) by 1040 days.

(21) Appl. No.: 11/692,274

(22) Filed: Mar. 28, 2007

(65) Prior Publication Data

US 2007/0230229 A1  Oct. 4, 2007

Related U.S. Application Data

(60) Provisional application No. 60/789,448, filed on Apr. 4, 2006.

(51) Int. Cl.
*H01H 9/30* (2006.01)
*H01H 9/56* (2006.01)
*H01H 73/18* (2006.01)
*H02H 9/08* (2006.01)

(52) U.S. Cl. .......................................... 361/13; 361/93.9
(58) Field of Classification Search ...................... 361/13
See application file for complete search history.

(56) References Cited

U.S. PATENT DOCUMENTS

| | | | | |
|---|---|---|---|---|
| 5,140,171 | A * | 8/1992 | de Janasz | 307/10.8 |
| 6,218,788 | B1 * | 4/2001 | Chen et al. | 315/225 |
| 6,417,668 | B1 * | 7/2002 | Howard et al. | 324/426 |
| 6,522,033 | B1 | 2/2003 | Nevo | |
| 7,095,191 | B2 * | 8/2006 | Sakurai | 318/139 |
| 7,265,953 | B2 * | 9/2007 | Hourai et al. | 361/18 |
| 2004/0223278 | A1 * | 11/2004 | Bryan | 361/100 |
| 2005/0265087 | A1 | 12/2005 | Hourai et al. | |

FOREIGN PATENT DOCUMENTS

DE  102 35 431  2/2004

* cited by examiner

*Primary Examiner* — Dharti Patel

(57) ABSTRACT

A solid state pre-charge module includes a relay, a transistor connected to the relay and a solid state device connected to the transistor. The solid state device controls switching of the transistor.

20 Claims, 3 Drawing Sheets

SOLID STATE PRE-CHARGE MODULE

CROSS REFERENCE TO RELATED APPLICATIONS

This application claims priority to and the benefit of the filing date of U.S. Provisional Application No. 60/789,448, filed on Apr. 4, 2006, entitled "Solid. State Pre-Charge Module," which is hereby incorporated by reference in its entirety.

BACKGROUND OF THE INVENTION

This invention relates generally to electrical relays, and more particularly, to a pre-charge component for an electrical load.

Relays are electrical switches that open and close based on an applied electrical current. Different relays may be used for different types of applications or based on certain operating parameters. The relays are typically of an electromagnetic or solid state type. In high voltage applications, the relays must be designed to handle the effects of the high voltage. For example, in hybrid electric vehicles (HEVs), very large integrated capacitors, such as, larger than 2000 micro-Farads (µF), may be provided to power one or more loads. The capacitor(s) in this type of application must be pre-charged to avoid a damaging inrush current being applied to the relay contacts when power is switched on. Essentially, when power is applied to an uncharged capacitor an excessive amount of current rushes to the capacitor. The large inrush of current may cause excessive heating and decrease the life of the capacitor if a pre-charge circuit is not provided. The large inrush of current also can damage the relay contacts that switch power to the capacitor. Further, the main disconnect relay would need to be very large if the pre-charge circuit were not present and the system fuse also may be tripped more easily and more often without the pre-charge circuit.

Currently, in these high voltage applications, the pre-charge module is typically an electromechanical relay capable of switching a large voltage, such as 300V to 600V. The pre-charge module is used in series with a resistor across the main contacts of a contactor to pre-charge the capacitor(s). However, these high voltage electromechanical pre-charge modules are very expensive and usually larger in size. Thus, the overall cost of the system is increased and the size of the module including this relay also may be larger, thereby limiting the space for other components.

BRIEF DESCRIPTION OF THE INVENTION

In an embodiment, a pre-charge module is provided that includes a relay, a transistor connected to the relay and a solid state device connected to the transistor. The solid state device controls switching of the transistor.

In another embodiment, a pre-charge architecture is provided that includes a main contactor and a pre-charge module including a solid state device with electromechanical isolation, wherein the pre-charge module is connected across the main contactor. The pre-charge architecture further includes a capacitor connected to the main contactor.

DETAILED DESCRIPTION OF THE INVENTION

Figure 1:
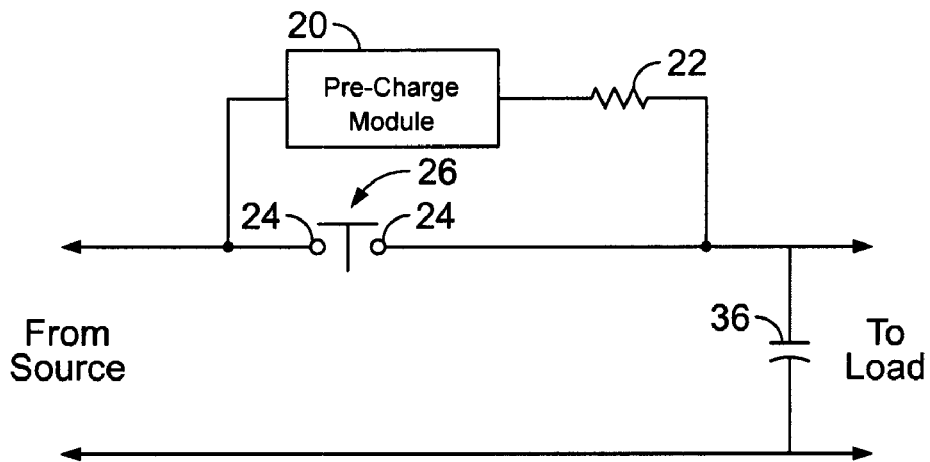
FIG. 1 is a schematic diagram of a pre-charge circuit formed in accordance with an exemplary embodiment controlling power to a load.

FIG. 1 is a schematic diagram showing a pre-charge circuit having a pre-charge module 20 formed in accordance with various exemplary embodiments controlling power to a load. The pre-charge module 20 may be of a solid state type and configured as a solid state module in series with a pre-charge resistor 22, for example a ten ohm (10Ω) pre-charge resistor and that are together connected across contacts 24 of a contactor 26. In the illustrated embodiment, the contactor 26 is a main relay or main contactor for switching power on and off to the load (e.g., a load within a Hybrid Electric Vehicle (HEV)). The power that is switched on and off by the contactor 26 may be from different types of power sources, for example, from a fuel cell, batteries, a generator, etc. It should be noted that although the pre-charge module 20 may be described in connection with a particular application or for a particular use, the various embodiments are not so limited and the pre-charge module 20 may be used in any application where pre-charging is needed or desired.

In operation, the pre-charge module 20 pre-charges one or more capacitors 36. The capacitor(s) 36 may be large, such as, 1000 micro-Farads (µF) or 2000 µF, with the pre-charge module 20 isolating a pre-charge voltage ground (e.g., 12 volt ground) from a full power voltage ground (e.g., 300 volt ground or 600 volt ground). The pre-charge module 20 switches on to pre-charge the capacitor(s) 36 when a ground is applied to the pre-charge module 20 and switches off (allowing the contactor 26 to switch on) when the capacitor(s) 36 has reached a predetermined pre-charge level, for example, above about eighty percent of the total charge capacity of the capacitor(s) 36, above about ninety percent of the total charge capacity of the capacitor(s) 36, above about ninety-five percent of the total charge capacity of the capacitor(s) 36, above about ninety-six percent of the total charge capacity of the capacitor(s) 36, about ninety-nine percent of the total charge capacity of the capacitor(s) 36 (which may be considered a full charge), etc. However, the pre-charge-relay 20 may be configured to allow the capacitor(s) 36 to reach any predetermined pre-charge level that is higher or lower than the levels described.

Figure 2:
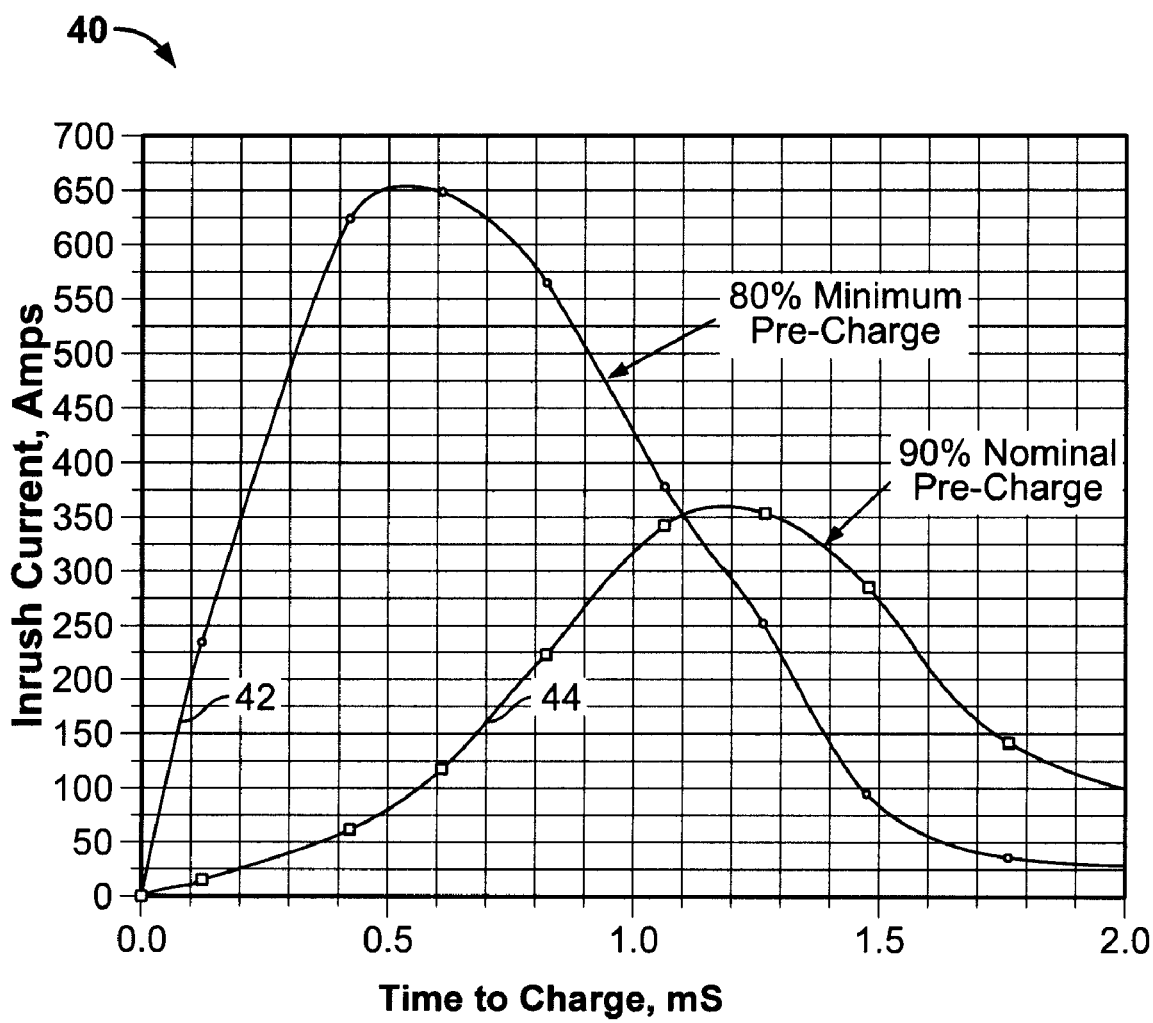
FIG. 2 is a graph illustrating an exemplary inrush current based on a relay pre-charge.

A graph 40 illustrating an exemplary inrush current based on a relay pre-charge percentage is shown in FIG. 2. The graph 40 defines a time to a charge across a horizontal axis and an in-rush current in amps (Inrush Current) across a vertical axis. A curve 42 represents in-rush current at an eighty percent (80%) minimum pre-charge and curve 44 represents in-rush current at a ninety percent (90%) nominal pre-charge for the capacitor(s) 36 is illustrated. In should be noted that the maximum in-rush current for the curve 42 is about 650 amps while the maximum in-rush current for the curve 44 is about 350 amps. As should be appreciated, the in-rush current and time to charge is dependent on different factors including, for example, the power of the source, the type and capacity of the capacitor(s) 36, etc. Thus, the pre-charge module 20 may be configured differently to pre-charge the capacitor(s) 36 based on the charging characteristics for the capacitor(s) 36.

Figure 3:
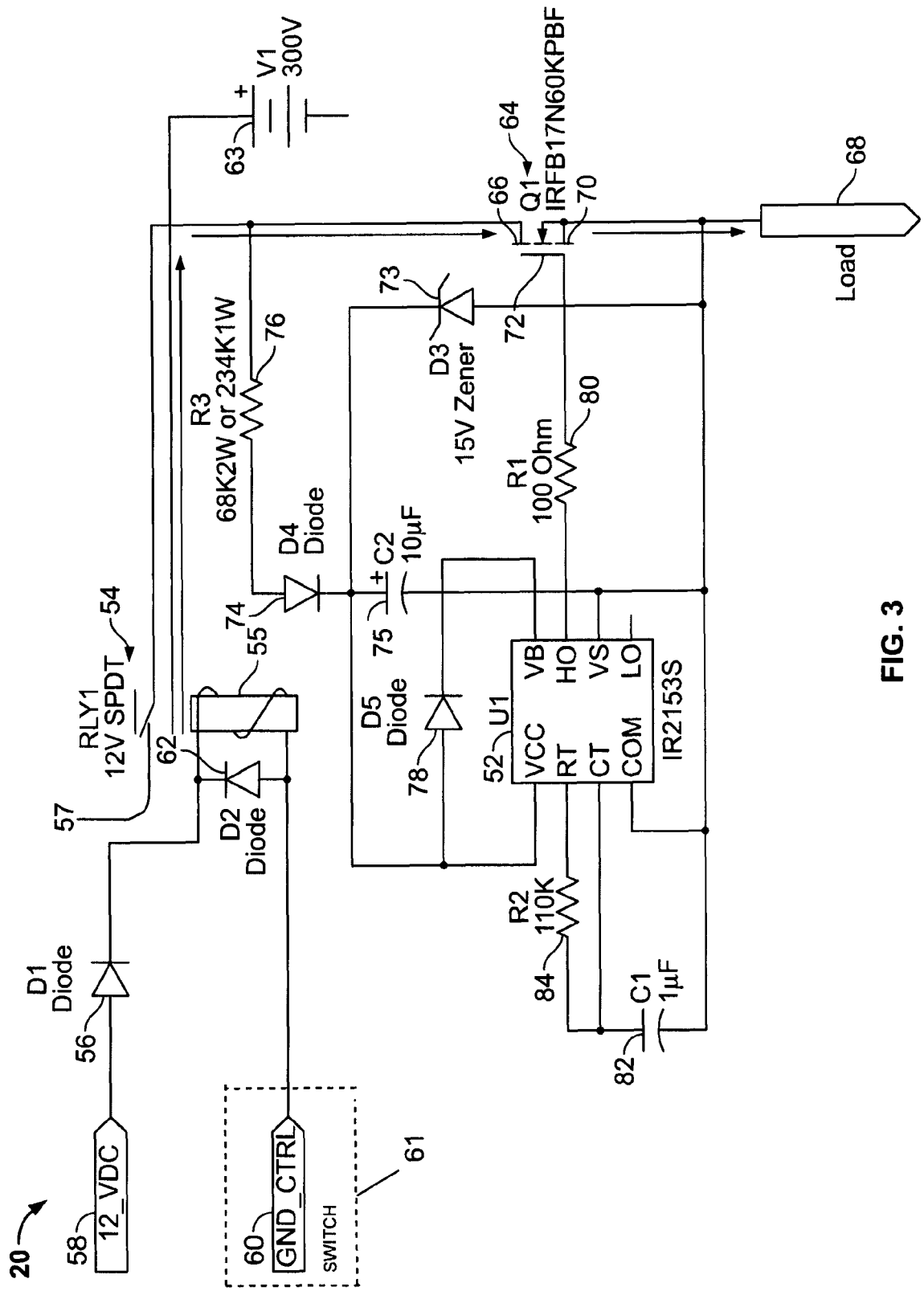
FIG. 3 is a schematic diagram of a pre-charge module formed in accordance with an exemplary embodiment.

FIG. 3 is a schematic diagram of the pre-charge module 20 formed in accordance with exemplary embodiments is shown. The pre-charge module 20 is configured as a solid state pre-charge module that includes a solid state device, and more particularly, a solid state driver component 52, and a relay 54, which in the illustrated embodiment is an integrated isolation electromechanical relay. For example, in the exemplary embodiment the driver component 52 is a self-oscillating half-bridge driver, such as, an IR2153S driver available from International Rectifier of El Segundo, Calif. The relay 54 in that embodiment is a standard twelve volt (12V) relay, for example, a 12V automotive grade electromechanical relay. However, depending on the application, a different type of relay having a different rated voltage may be used.

One end of a relay coil 55 of the relay 54 is connected through a diode 56 to a low voltage power supply 58, for example, a twelve volt (12V) power supply (e.g., 12V car battery) and the other end of the relay coil 55 of the relay 54 is connected to switch 61 that switches to ground 60 and is open to provide isolation when not switched to ground 60 (e.g., no current flow). The diode 56 operates to block reverse current, for example, if a power source is connected to the relay 54 in reverse (e.g., opposite polarity). A diode 62 is also connected across the coils 55 of the relay 54. The diode 62 operates to recirculate power during operation to minimize transients.

The relay 54 is operable to switch power from a high voltage power supply 63, for example, a 300 volt power supply (e.g., 300V hybrid electric vehicle power pack) to a transistor 64. In particular, the low voltage power supply 58 is connected to the relay coil 55 and the high voltage power supply 63 is connected to a normally open contact 57 (pin 5 shown in FIG. 4), which closes when energized. When the normally open contact 57 closes, a connection is made to ground, and power is provided through a movable contact 59 (e.g., pin 4 of the movable contact 59 shown in FIG. 4) to the transistor 64 (Q1), which in the illustrated embodiment is a metal-oxide-semiconductor field-effect transistor (MOSFET) and to the driver component 52. In operation, high voltage from the high voltage power supply 63 is provided to the transistor 64 and a reduced voltage (e.g., 15 volts-18 volts) that is limited or clamped by the a Zener diode 73 (D3) is provided to the driver component 52. It should be noted that the excess voltage (e.g., 285 volts) is dropped across a resistor 76 (R3).

The driver component 52 is connected to a gate 72 of the MOSFET through a resistor 80 (R1) and in the illustrated embodiment is an eight pin IR2153S chip having the following pin configuration:

$V_{CC}$ Logic and internal gate drive supply voltage
$R_T$ Oscillator timing resistor input
$C_T$ Oscillator timing capacitor input
COM Common (reference for $V_{CC}$ voltage)
LO Low side gate driver output
$V_S$ High voltage floating supply return
HO High side gate driver output
$V_B$ High side gate driver floating supply In this embodiment, the LO pin of the driver component 52 is unconnected and the COM pin of the driver component 52 is connected to a source 70 of the transistor 64 with a load 68 also connected to the source 70. The $V_S$ pin of the driver component 52 is connected to the COM pin of the driver component 52. A capacitor 75 provides 15 volts for the $V_{CC}$ power and is referenced to the $V_S$ pin of the driver component 52. Further, the high voltage is dropped across resistor 76 (which is also connected to a diode 74 (D4)) because the Zener diode 73 clamps the voltage at, for example, 15 volts, as reference to the COM pin of the driver component 52, which charges the capacitor 75 and is provided through a diode 78 (D5) to the $V_B$ pin of the driver component 52. When the voltage at the source 70 of the transistor 64 (which is the voltage at the COM pin) approaches the voltage at a drain 66 of the transistor 64, the driver component 52 shuts off. It should be appreciated that if a different driver component 52 is used, different connections are made to provide operation of the pre-charge module 20 as described herein.

Thus, in operation, current flow is shown by the arrow in FIG. 3 with the driver component 52 controlling the switching on and off of the transistor 64 such that in the illustrated embodiment the MOSFET is switched off when the voltage at the source 70 of the transistor 64 approaches the voltage at the drain 66 of the MOSFET. Accordingly, the pre-charge module 20 shuts off when the capacitor 36 is pre-charged to a predetermined level, which may be a near full charge (e.g., 99 percent of full capacity) as described below.

The driver component 52 essentially provides a floating ground such that there is no connection between the low voltage power supply 58 and the high voltage power supply 63. The driver component 52 includes a half-bridge gate driver with a front end oscillator that oscillates at a fifty percent (50%) duty cycle. The frequency of the duty cycle (e.g., one kilohertz (kHz)) is determined by the values of the capacitor 82 and the resistor 84.

Figure 4:
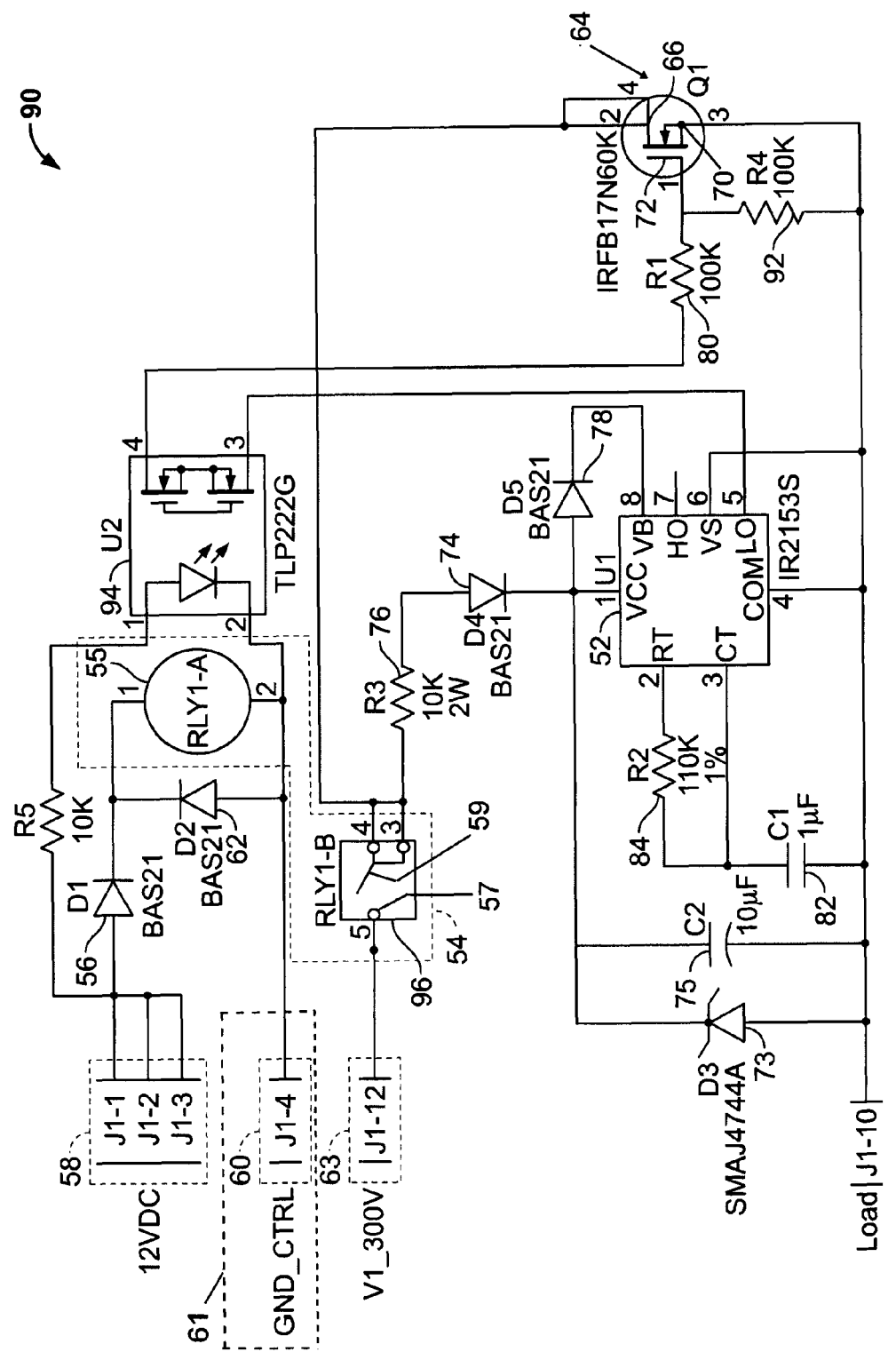
FIG. 4 is a schematic diagram of a pre-charge module formed in accordance with another exemplary embodiment.

As an example, and using the embodiment illustrated in FIG. 4, once the relay 54 is energized, for example, by the low voltage power supply 58, the voltage from the high voltage power supply 63 (e.g., 300V) is applied through the relay contacts, for example, from the normally open contact 57 through the movable contact 59, to the transistor 64. A lower voltage (e.g., 15V-18V) is clamped/limited by the diode 73 and is applied to the Vcc pin of the driver component 52 with reference to common, for example, the COM pin of the driver component 52. After a predetermined time period delay, which is determined by a capacitor 82 (C1) and a resistor 84 (R2), the transistor 64 will be turned ON by the driver component 52 and supply 300V through a pre-charge resistor 22 (shown in FIG. 1) to begin the pre-charging provided by the MOSFET.

The delay and charging time for the capacitor(s) 36 are programmable and configurable, based on, for example, the application, the capacitor(s), etc. The values of the capacitor 82 and the resistor 84 may be chosen depending on a time constant of the pre-charge resistor 22 and the capacitor(s) 36. For example, if the pre-charge resistor 22 and capacitor 36 values are 10 Ohm and 2000 micro Farad, respectively, then the charging time constant is 10*2000=20 msec. Three time constants, in this example, 60 msec, are required to charge the 2000 micro Farad capacitor to 95% of the charging voltage, which is 300V in the application illustrated in FIG. 3 before closing of the contactor 26 (shown in FIG. 1). Accordingly, the delay and charging time of the pre-charge module 20, which may be configured as a solid state pre-charge module, must be greater than 60 msec to allow a desired or required pre-charge.

When the capacitor 36 is fully pre-charged, the driver component 52 will stop driving the gate 72 of the transistor 64 (e.g., MOSFET), thus stopping charging of the capacitor(s) 36, even with the relay 54 still energized. The relay 54 can then be de-energized without current flowing. The relay 54 will not be energized or de-energized while current is flowing. Thus, a regular 12V automotive electromechanical relay may be utilized. The contactor 26 never closes until the capacitor(s) 36 are pre-charged. The pre-charge module 20 automatically switches off upon reaching the required or desired pre-charge (e.g., 99 percent pre-charge of the capacitor(s) 36) as described herein.

FIG. 4 is a schematic diagram of a pre-charge module 90 formed in accordance with another exemplary embodiment.

The pre-charge module 90 is similar to the pre-charge module 20 wherein like numerals represent like components. However, the pre-charge module 90 also includes a resistor 92 connected between the gate 72 and the source 70 of the transistor 64. The resistor 92 in combination with the resistor 80 ensures that the resistor 64 switches on and off sharply based on the oscillation of the driver component 52.

Additionally, the pre-charge module 90 includes an optocoupler 94 connected between the LO pin of the driver component 52 and the gate 72 of the MOSFET. In the illustrated embodiment, the optocoupler 94 is a photocoupler or a photorelay such as a TLP222G photocouple/photorelay available from Toshiba America Inc. (Toshiba Corporation) in New York, N.Y. The optocoupler 94 provides protection to turn off the transistor 64, for example, if a sudden interruption in the relay coil voltage occurs (e.g., pre-charge module 20 or 90 switched on and then back off quickly). For example, if a sudden interruption in the voltage at the relay coil 55 occurs, the optocoupler 94 turns off the MOSFET to stop current flow in case the contacts of the relay 54 open again. The transistor 64 carries the current while the relay 54 is closed. In operation, the optocoupler 94 closes upon the switch 61 switching to ground 60 and closes before the relay 54 closes such that the optocoupler 94 can open again if needed. Essentially, the optocoupler 94 provide a safety precaution and protects the relay contacts to ensure that no current flows when the contacts are opened.

It should be noted that the component parts of the relay 54 are also illustrated in FIG. 4. Specifically, in addition to the relay coil 55, a relay switch 96 is also shown. The operation of the pre-charge module 90 is the same as the pre-charge module 20. Both the pre-charge module 20 and the pre-charge module 90 include a low voltage relay (e.g., 12V automotive relay) such as the relay 54 in series with a MOSFET that provides isolation against leakage current when the relay coil, for example relay coil 55 is disabled (e.g., prevent leakage through the MOSFET). This combination provides pre-charging of a high voltage capacitor using, for example, a self-oscillating half-bridge driver, such as, the driver component 52 that operates without a ground (e.g., the IC chip floats) to provide isolation between the ground of a 12V power supply, for example, the low voltage power supply 58 and a 600V or 300V power supply, for example, the high voltage power supply 63. The pre-charge module 20 or the pre-charge module 90 will turn off automatically once the capacitor has been pre-charged. Thus, a capacitor, for example, the capacitor 36 is pre-charged and then the main relay, such as, the contactor 26 closes or is switched on to allow current flow. For example, the pre-charge module 20 or the pre-charge module 90 is activated for a time period (e.g., 200 msec) before the main relay closes in order to pre-charge one or more large capacitors.

While the invention has been described in terms of various specific embodiments, those skilled in the art will recognize that the invention can be practiced with modification within the spirit and scope of the claims.

What is claimed is:

1. A pre-charge module comprising:
a relay;
a transistor connected to the relay and to a power supply; and
a solid state device connected to a gate of the transistor, the solid state device controlling switching of the transistor such that the transistor is switched off when a voltage at a source of the transistor approaches a voltage at a drain of the transistor, to switch off the solid state device such that a capacitor is pre-charged, and providing a floating ground.

2. A pre-charge module in accordance with claim 1, wherein the transistor comprises a metal-oxide-semiconductor field-effect transistor (MOSFET).

3. A pre-charge module in accordance with claim 1, wherein the solid state device comprises a driver component driving the gate of the transistor at a fifty percent duty cycle.

4. A pre-charge module in accordance with claim 1, wherein the solid state device comprises a self-oscillating half-bridge driver.

5. A pre-charge module in accordance with claim 1, wherein the solid state device comprises a floating ground integrated circuit chip.

6. A pre-charge module in accordance with claim 1, wherein the relay comprises an automotive grade electromechanical relay having a rating of twelve volts.

7. A pre-charge module in accordance with claim 1, further comprising an optocoupler connected between a low (LO) output of the solid state device and the gate of the transistor.

8. A pre-charge module in accordance with claim 1, wherein a normally open contact of the relay is connected to the power supply providing at least 300 volts.

9. A pre-charge module in accordance with claim 1, further comprising a resistor and a capacitor and wherein the solid state device comprises a half-bridge driver, with the resistor and the capacitor setting a time period before the transistor is switched on.

10. A pre-charge module in accordance with claim 1, wherein the transistor is connected to a capacitor to be pre-charged and the transistor is switched off upon the capacitor reaching a full charge, wherein the transistor is switched on by the solid state device after a predetermined time delay based on values of a capacitor and resistor connected to the solid state device such that pre-charging is controlled automatically with the predetermined time delay.

11. A pre-charge module in accordance with claim 1, wherein the transistor is connected to a capacitor to be pre-charged and the transistor is switched off upon the capacitor being charged to a predetermined capacity.

12. A pre-charge module in accordance with claim 1, wherein the transistor is connected to a high voltage power supply.

13. A pre-charge module in accordance with claim 1, further comprising a Zener diode connected to the solid state device reducing a voltage to the solid state device.

14. A pre-charge module comprising:
a relay;
a transistor connected to the relay;
a solid state device connected to the transistor, the solid state device controlling switching of the transistor and having a floating ground; and
a photocoupler connected to a ground switch, the ground switch connected to the relay.

15. A pre-charge architecture comprising:
a capacitor connected to a main contactor; and
a pre-charge module including a floating ground solid state device with electromechanical isolation, wherein the pre-charge module is connected across the main contactor, the pre-charge module having an electrical circuit that sets the delay and charging time for the capacitor to control a pre-charging of the capacitor and automatically switches off when the capacitor is pre-charged, the electrical circuit including a driver component switched by a transistor, wherein the transistor switching is determined based on a capacitor and resistor arrangement defining a predetermined pre-charge level for the capacitor.

16. A pre-charge architecture in accordance with claim 15, wherein the capacitor has a capacitance of at least 1000 microfarads.

17. A pre-charge architecture in accordance with claim 15, wherein the pre-charge module comprises a relay and wherein contacts of the relay are connected to a power source of at least 300 volts.

18. A pre-charge architecture in accordance with claim 15, wherein the capacitor is part of a hybrid electric vehicle (HEV).

19. A pre-charge architecture in accordance with claim 15, wherein the pre-charge module comprises a low voltage relay having a typical operating voltage of about twelve volts.

20. A pre-charge architecture in accordance with claim 15, wherein the pre-charge module comprises a metal-oxide-semiconductor field-effect transistor (MOSFET) with the switching of the MOSFET controlled by the solid state device and an optocoupler connected between the solid state device and a gate of the MOSFET.

* * * * *